Oct. 10, 1961     J. A. STARK     3,003,828
RECIRCULATING BEARING
Filed June 25, 1957
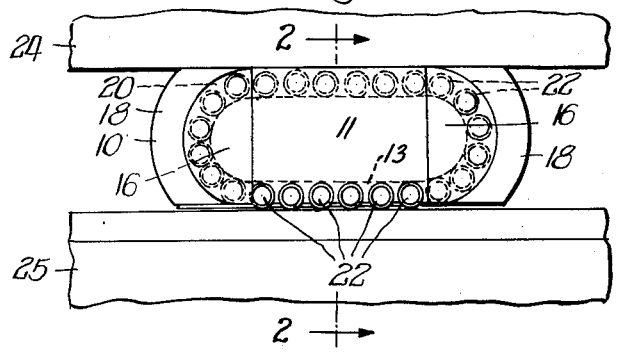
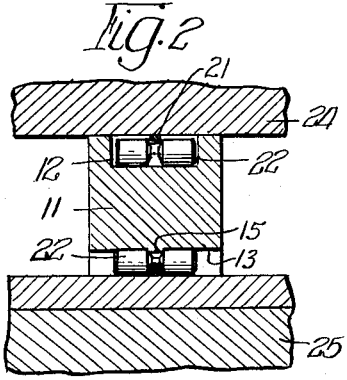
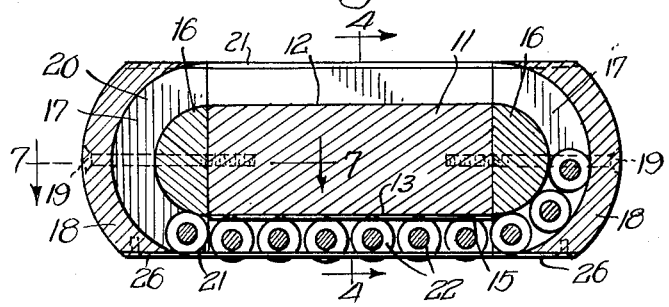
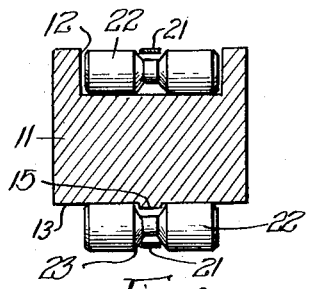
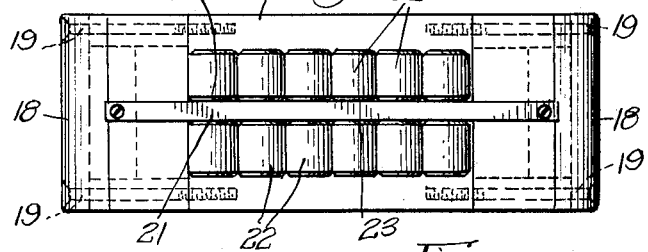
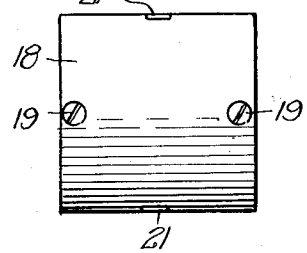
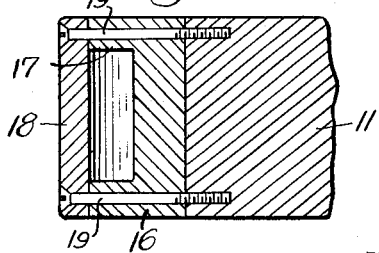
INVENTOR.
James A. Stark,
BY
Byron, Hume, Groen & Clement
Attys

United States Patent Office 3,003,828
Patented Oct. 10, 1961

3,003,828
RECIRCULATING BEARING
James A. Stark, 4846 Central Ave., Western Springs, Ill.
Filed June 25, 1957, Ser. No. 667,787
3 Claims. (Cl. 308—6)

This invention pertains to antifriction devices and in particular to antifriction devices of the recirculating type for permitting linear motion.

In the construction of grinders, milling machines, and other machines, having linearly reciprocal ways, it is necessary to provide some means for minimizing friction. In the past oil films have been used to reduce friction between the carriage and the bed. This has been unsatisfactory because of variation in the physical properties of the lubricant. For example, changes in viscosity of the lubricant affect the clearance. Also in certain instances a slow moving carriage will have a tendency to stick, which results in poor quality work. Antifriction devices, including ball and roller bearings, have also been used in an attempt to eliminate the above named problems. However, they have not proved to be wholly satisfactory.

Therefore, it is an object of the invention to provide an antifriction device of novel construction.

Another object of the invention is to provide a roller type bearing that is simple in construction and may be economically manufactured.

Another object of the invention is to provide a roller type antifriction device which is compact, has a high load capacity, and is non-skewing.

Still another object of the invention is to provide a roller type antifriction device that is a self-contained unit which may be readily mounted on existing machine designs.

Other objects of the invention will be apparent upon development of the specification with reference to the drawings.

In the drawings:

FIGURE 1 is a diagrammatic illustration of the bearing embodying the invention, mounted in a working environment.

FIGURE 2 is a sectional view taken along the line 2—2 of FIG. 1.

FIGURE 3 is a side view in elevation and in section of the recirculating bearing embodying the invention.

FIGURE 4 is a sectional view taken along the line 4—4 in FIG. 3.

FIGURE 5 is a bottom view of the bearing shown in FIG. 3.

FIGURE 6 is an end view of the bearing shown in FIG. 3.

FIGURE 7 is a sectional view taken along the line 7—7 in FIG. 3.

Referring now to the drawings, there is shown a recirculating type bearing generally denoted by the numeral 10. The bearing may be fabricated from any suitable material, but in its preferred embodiment it is constructed of a relatively hard metal such as bearing steel. Bearing steel, being relatively hard, is wear resistant and thus would insure a relatively long and useful life for the bearing.

The recirculating bearing 10 is comprised of several parts, one of which is the race body 11. As best shown in FIGURE 4, the race body 11 is generally rectangular in cross section and is provided with the channel 12 on its upper face. The channel 12 is of sufficient width and depth to fully receive the antifriction members that are used in the construction of the bearing. On the lower face of the race body 11 is the centrally located shoulder 15 which serves to guide the antifriction members as will be explained more fully later on. It can be seen that the race body can alternatively be characterized as being composed of a cross member and two side members arranged in a U-shaped configuration.

Secured to the ends of the race body 11 are the return portions 16 which are semi-circular in shape. The return portions 16 are provided with the channels 17 which are substantially of the same cross sectional dimensions as the channel 12 in the race body 11. As best shown in FIGURE 3, the channels 17 are continuous with the channel 12 and the lower surface 13 of the race body 11. A cover 18 is secured to each of the return portions 16 so as to enclose the channel 17, by the screw 19. As best shown in FIGURES 4 and 5, a pair of roller retainer members 21 extend lengthwise of the race body 11 and are secured at their ends to the covers 18. These members retain the antifriction members within the channel 12 and to the lower face 13 of the body 11, as will be apparent later on. Referring again to FIGURE 3, it can now be seen that the previously disclosed parts, when assembled, form spaced trackways which define a generally ovate race way 20.

As best shown in FIGURE 4 the antifriction members 22 are of the roller type having a centrally located annular recess 23 therein. The antifriction members 22 are of sufficient diameter that they extend beyond the edges 26 of the covers 18 when in touching relationship with the surface 13. The recess 23 should be of sufficient width to receive the shoulder 15. The retainer members 21 are of the same width or less as the shoulder 15, so that they will fit within the recess 23 also. As was mentioned previously, the purpose of the shoulder 15 is to guide the antifriction members 22 so that their rolling axis is perpendicular to the direction of travel. If the rollers were permitted to skew, obviously there would be a rubbing motion as well as a rolling motion between them and the adjacent surface. Thus friction would be high and the life of the rollers would be greatly decreased by the wear incurred through the rubbing motion.

Referring back to FIG. 3, the race way 20 is shown in its preferred embodiment to be substantially filled with the antifriction members 22. However, it is conceivable that a fewer number of antifriction members may be used in the construction of the bearing. If that is the case, it may be desirable to use some suitable spacing means between the individual antifriction members, although this is not necessary to the practice of the invention.

In FIGURES 1 and 2 the bearing embodying the invention is shown as being mounted between two horizontal surfaces 24 and 25. The upper surface 24 represents the movable carriage and support for a milling table, grinding spindle, or the like, and the lower surface 25, the machine bed way. In this instance the surface 24 is represented as the movable surface to which is secured the bearing 10 by some suitable means (not shown). On the lower surface 25 rest the antifriction members 22 which are of sufficient height to prevent the touching of the covers 18. Thus, as the surface 24 reciprocates linearly, bearing members 22 are rolled along the lower face 13 and into the return portion 16 and the channel 12. The bearing 10 may be inverted from the position shown in FIGURE 1 so that the surface 24 is supported by the antifriction members 22 and rolls thereon. In this position the bearing 10 would remain stationary with respect to the surface 25. As was mentioned previously, the bearing in its preferred embodiment is fabricated from some suitable relatively hard material such as bearing steel. By using such material it may be finish ground after being fully hardened and in this manner extremely close tolerances realized.

From the foregoing description it can be seen that a simple and economical recirculating bearing has been provided. At the same time this bearing may be readily adapted to be incorporated into commercial machines such as milling machines, grinding machines, and the like.

Although certain elements, materials, and other details have been specified, it is to be understood that these are by way of example rather than limitation. It is apparent that certain modifications may be made within the scope of the claims without departing from the spirit of the invention.

I claim:

1. A recirculating antifriction device adapted to be disposed between two surfaces at least one of which is linearly movable with respect to the other comprising a raceway, a plurality of antifriction roller members disposed within said raceway for rolling movement therein, each of said roller members having an annular recess intermediate its ends, said raceway including a body member in cross section composed of a cross member and two side members for at least a portion of its length arranged in a substantially U-shaped configuration in which the side members project from the cross member a distance greater than the diameter of the roller members, the upper and lower surfaces of said cross member being in rolling engagement with said antifriction roller members and being substantially flat in the direction of travel, inner and outer semicircular race members at each end of said body member secured thereto to form enclosed raceways connecting said upper and lower surfaces, a shoulder on said lower surface extending lengthwise thereof, said shoulder being at least partially received in said annular recesses so as to maintain the axes of said antifriction roller members substantially normal to the direction of travel, said antifriction members when in engagement with said lower surface being adapted to be in rolling contact with one of the surfaces between which the antifriction device is mounted, the upper ends of said side members being in engagement with the other of the two surfaces, an elongate retainer member extending between said outer race members substantially parallel with said lower surface, said elongate retainer member being spaced from said lower surface a distance greater than the combination of the maximum radius of said antifriction roller members and the radius at said recess, and less than the maximum diameter of said antifriction roller members, a second elongate retainer member extending between said outer race member in a substantially parallel spaced relationship with said upper surface and at least partially received in said annular recesses.

2. A recirculating antifriction device adapted to be disposed between two surfaces at least one of which is linearly movable with respect to the other comprising a raceway, a plurality of antifriction roller members disposed within said raceway for rolling movement therein, each of said roller members having an annular recess intermediate its ends, said raceway including a body member in cross section composed of a cross member and two side members for at least a portion of its length arranged in a substantially U-shaped configuration in which the side members project from the cross member a distance greater than the diameter of the roller members, the upper and lower surfaces of said cross member being in rolling engagement with said antifriction roller members and being substantially flat in the direction of travel of said roller members, inner and outer semicircular race members at each end of said body member secured thereto to form enclosed raceways connecting said upper and lower surfaces, a shoulder on said lower surface extending lengthwise thereof, said shoulder being at least partially received in said annular recesses so as to maintain the axes of said antifriction roller members substantially normal to the direction of travel, said antifriction members when in engagement with said lower surface being adapted to be in rolling contact with one of the surfaces between which the antifriction device is mounted, and an elongate retainer member extending between said outer race members in a spaced substantially parallel relationship with said lower surface for maintaining said antifriction roller members therebetween, said elongate retainer being substantially aligned with said annular recess and normally partially received therein, the upper ends of said side members being in engagement with one of the two surfaces.

3. A recirculating antifriction device adapted to be disposed between two surfaces at least one of which is linearly movable with respect to the other comprising a raceway, a plurality of antifriction roller members disposed within said raceway for rolling movement therein, each of said roller members having an annular recess intermediate its ends, said raceway including a body member in cross section composed of a cross member and two side members depending at right angles from said cross member in which the side members project from the cross member a distance greater than the diameter of the roller members, the upper and lower surfaces of said cross member being in rolling engagement with said antifriction roller members being substantially flat in the direction of travel of said roller members, inner and outer semicircular race members at each end of said body member secured thereto to form inclosed raceways connecting said upper and lower surfaces, a shoulder on said lower surface extending lengthwise thereof, said shoulder being at least partially received in said annular recesses so as to maintain the axes of said antifriction roller members substantially normal to the direction of travel, said antifriction members when in engagement with said lower surface being adapted to be in rolling contact with one of the surfaces between which the antifriction device is mounted, and an elongate retainer member extending between said outer race members in a spaced substantially parallel relationship with said lower surface for maintaining said antifriction roller members therebetween, said elongate retainer being substantially aligned with said annular recess and normally partially received therein.

References Cited in the file of this patent

UNITED STATES PATENTS

| | | |
|---|---|---|
| 2,211,881 | Collett | Aug. 20, 1940 |
| 2,230,442 | Arms | Feb. 4, 1941 |
| 2,334,227 | Stallman | Nov. 16, 1943 |
| 2,402,546 | Gaykowski | June 25, 1946 |
| 2,723,886 | Warshaw | Nov. 15, 1955 |

FOREIGN PATENTS

| | | |
|---|---|---|
| 1,073,668 | France | Mar. 24, 1954 |

UNITED STATES PATENT OFFICE
CERTIFICATION OF CORRECTION

Patent No. 3,003,828                  October 10, 1961

James A. Stark

It is hereby certified that error appears in the above numbered patent requiring correction and that the said Letters Patent should read as corrected below.

Column 3, line 48, for "member" read -- members --; column 4, lines 17 and 51, for "recess", each occurrence, read -- recesses --.

Signed and sealed this 3rd day of April 1962.

SEAL)
Attest:

ERNEST W. SWIDER
Attesting Officer

DAVID L. LADD
Commissioner of Patents